United States Patent
Visser et al.

(10) Patent No.: US 12,064,912 B2
(45) Date of Patent: Aug. 20, 2024

(54) METHOD FOR FABRICATING A CONTAINER AND THE CONTAINER

(71) Applicant: Furanix Technologies B.V., Amsterdam (NL)

(72) Inventors: Hendrikus Antonius Visser, Amsterdam (NL); Jesper Gabriël van Berkel, Amsterdam (NL)

(73) Assignee: Furanix Technologies B.V., Amsterdam (NL)

( * ) Notice: Subject to any disclaimer, the term of this patent is extended or adjusted under 35 U.S.C. 154(b) by 10 days.

(21) Appl. No.: 17/257,048

(22) PCT Filed: Jul. 11, 2019

(86) PCT No.: PCT/NL2019/050433
§ 371 (c)(1),
(2) Date: Dec. 30, 2020

(87) PCT Pub. No.: WO2020/013694
PCT Pub. Date: Jan. 16, 2020

(65) Prior Publication Data
US 2021/0260808 A1 Aug. 26, 2021

(30) Foreign Application Priority Data
Jul. 12, 2018 (NL) .................................... 2021297

(51) Int. Cl.
*B29C 49/08* (2006.01)
*B29C 49/00* (2006.01)
(Continued)

(52) U.S. Cl.
CPC .......... *B29C 49/0005* (2013.01); *B29C 49/08* (2013.01); *B29C 49/4823* (2013.01);
(Continued)

(58) Field of Classification Search
CPC . B29C 49/08; B29C 49/4823; B29C 49/0005; B29C 2049/4838;
(Continued)

(56) References Cited

U.S. PATENT DOCUMENTS

| | | | |
|---|---|---|---|
| 2013/0171397 A1 | 7/2013 | Ghosh et al. | |
| 2015/0064383 A1* | 3/2015 | Kriegel | B29C 49/12 264/531 |
| 2016/0376400 A1 | 12/2016 | Moffitt et al. | |

FOREIGN PATENT DOCUMENTS

| WO | 2015/015243 A1 | 2/2015 |
|---|---|---|
| WO | 2015/031907 A1 | 3/2015 |

OTHER PUBLICATIONS

Wikipedia, Necking (engineering), ttps://en.wikipedia.org/w/index.php?title=Necking_(engineering)&oldid=1025752008, May 29, 2021, 3 pages.

(Continued)

*Primary Examiner* — Monica A Huson
(74) *Attorney, Agent, or Firm* — Hoffmann & Baron, LLP

(57) ABSTRACT

A container, preferably a bottle, is fabricated in a method comprising: —providing a preform comprising poly(ethylene 2, 5-furandicarboxylate); —stretch blow-molding the preform to form the container, wherein the stretch blow-molding comprises a stretching step of the preform to a ratio higher than the natural draw ratio of poly(ethylene 2, 5-furandicarboxylate) at a temperature in a range of 105° C. to 145° C., preferably in a range of 110° C. to 140° C., and at an equivalent axial strain rate at a reference temperature of 100° C. in the range of 0.001 to 10 $s^{-1}$, preferably in a range of 0.03 to 3 $s^{-1}$.

9 Claims, 4 Drawing Sheets

(51) Int. Cl.
*B29C 49/48* (2006.01)
*B29K 105/00* (2006.01)
*B29L 31/00* (2006.01)

(52) U.S. Cl.
CPC .. *B29C 2049/4838* (2013.01); *B29K 2023/06* (2013.01); *B29K 2105/0094* (2013.01); *B29K 2995/004* (2013.01); *B29L 2031/7158* (2013.01)

(58) Field of Classification Search
CPC .......... B29K 2995/004; B29K 2023/06; B29K 2105/0094; B29B 2911/14986; B29L 2031/7158
See application file for complete search history.

(56) References Cited

OTHER PUBLICATIONS

Wikipedia, Strain rate, https://en.wikipedia.org/w/index.php?title=Strain_rate&oldid=1006321056, Feb. 21, 2021, 4 pages.

\* cited by examiner

METHOD FOR FABRICATING A CONTAINER AND THE CONTAINER

CROSS-REFERENCE TO RELATED APPLICATIONS

This application is the National Stage of International Application No. PCT/NL2019/050433, filed Jul. 11, 2019, which claims the benefit of Netherlands Application No. 2021297, filed Jul. 12, 2018, the contents of which is incorporated by reference herein.

FIELD OF THE INVENTION

The invention relates to a method for fabricating a container, preferably a bottle, comprising poly(ethylene 2,5-furandicarboxylate) with an excellent shrinkage behavior, and a container, especially a bottle showing such behavior.

BACKGROUND TO THE INVENTION

Poly(ethylene 2,5-furandicarboxylate) (PEF) is a 100% bio-based and recyclable polymer that can be used for example as a material for container, especially food or beverage container. PEF's barrier and thermal properties are superior to conventional PET. It shows improved barrier properties for gases like carbon dioxide and oxygen, leading to a longer shelf life of packaged products. However, the barrier and mechanical properties are still limited for some applications, such as the use in hot filled containers. PEF reaches only 10-15% crystallinity in bottle side walls during stretch, yielding high shrinkage compared to PET, which readily reaches 25% crystallinity during bottle blowing. Crystallinity is known to reduce shrinkage and improve barrier and mechanical properties. In an earlier study (Codou et al; "Glass transition dynamics and cooperativity length of poly(ethylene 2,5-furandicarboxylate) compared to poly (ethylene terephthalate)", Phys. Chem. Chem. Phys., 2016, 18, 16647-16658.) the influence of quiescent crystallization on the glass transition of PEF does not reveal a strong relation between the amount/size of crystals and the glass transition, much different to what happens in PET. PEF shows a weaker interaction between the amorphous and the quiescent crystalline phases which is attributed to the lower network density of PEF. Thus quiescent crystallization does not improve the high temperature behavior and thus does not reduce the shrinkage of PEF.

Therefore it is an object of the invention to provide a container comprising PEF and having a reduced shrinkage as well as a method for producing such containers.

This is surprisingly achieved by containers comprising strain-induced crystalline PEF.

SUMMARY OF THE INVENTION

Thus according to a first aspect of the invention the invention provides a method for fabricating a container, preferably a bottle, the method comprising:
providing a preform comprising poly(ethylene 2,5-furandicarboxylate);
stretch blow-molding the preform to form the container, wherein the stretch blow-molding comprises a stretching step of the preform to a ratio higher than the natural draw ratio of poly(ethylene 2,5-furandicarboxylate) at a temperature in a range of 105° C. to 145° C., preferably in a range of 110° C. to 140° C., and at an equivalent axial strain rate at a reference temperature of 100° C. in the range of 0.001 to 10 $s^{-1}$, preferably in a range of 0.03 to 3 $s^{-1}$.

According to a second aspect the invention relates to a container, preferably fabricated according to the method according to the first aspect of the invention, comprising strain-induced crystalline poly(ethylene 2,5-furandicarboxylate).

The preform that is used in the present invention may comprise any amount of poly(ethylene 2,5-furandicarboxylate). In particular it comprises poly(ethylene 2,5-furandicarboxylate) in an amount of 80 to 100% wt. The poly (ethylene 2,5-furandicarboxylate) may comprise also additives such as stabilizers, colorants, impact modifiers etc. The amount of such additives suitably does not exceed 20% wt, based on the combination of poly(ethylene 2,5-furandicarboxylate) and additives.

In most preferred embodiments the preform is composed of poly(ethylene 2,5-furandicarboxylate), optionally with usual additives.

DETAILED DESCRIPTION OF THE INVENTION

Figure 1:
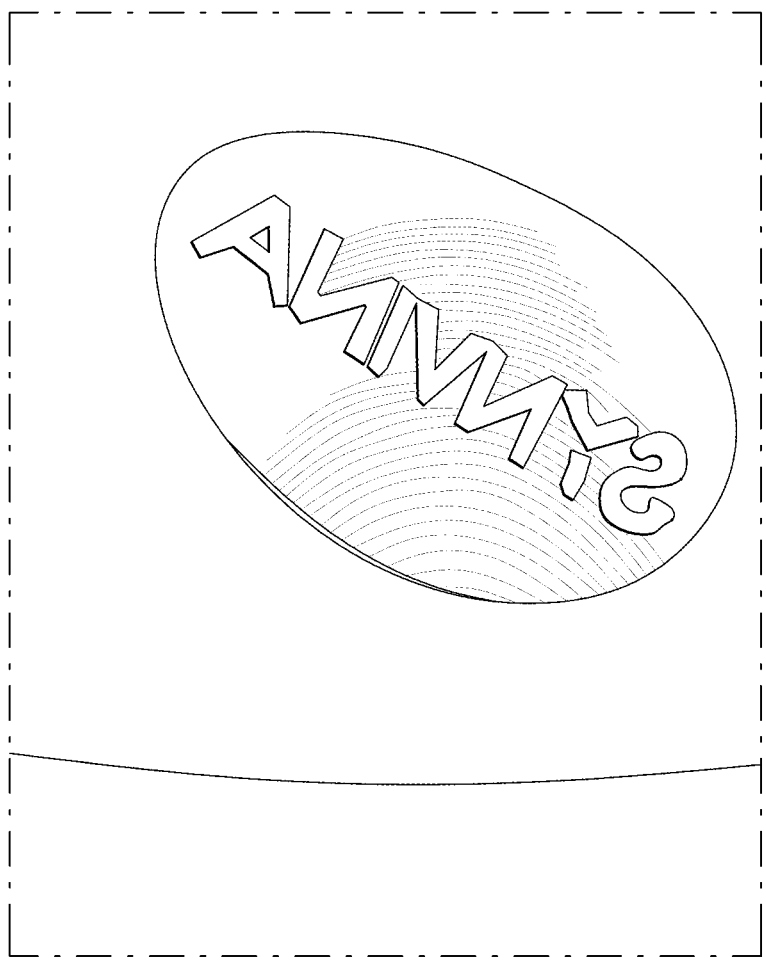
FIG. 1: Detail picture of steel mold with 3D printed plastic insert.

The invention includes the recognition that by stretching PEF in a state that corresponds to the physical state between the glass transition temperature and the melt temperature, i.e. an area known as the rubbery plateau, it is possible to create a morphology, especially a strain-induced crystallinity, that results in an increase of the glass transition temperature by more than 20° C. Additionally, the onset temperature at which shrinkage starts to occur on a timescale of seconds can be increased to above 100° C. Thus the resulting containers show improved high temperature properties and can be used for hot filling application. This change in behavior is not observed after quiescent crystallization.

In the present application use is made of the strain rate as presented in C. Combeaud et al. "Thermal and mechanical behavior of polyethylene 2,5-furandicarboxylate during stretching", N.I.C.E. 2016 conference, Oct. 17, 2016.

According to the presentation rectangular strips of PEF of >5 mm in length and 4 mm in width were milled from a PEF sheet, clamped with a clamp to a clamp distance of 5 mm and subjected to frequency sweeps from 0.1 Hz to 50 Hz (with 20 point per decade) at temperatures of 90° C. up to 140° C. (with steps of 5° C.). The strain amplitude was kept constant 5 μm (0.1% strain). The resulting storage moduli are determined. The storage moduli were shifted to a master curve using the Williams-Landel-Ferry (WLF) formula:

$$\log(a_T(T)) = -\frac{C_1(T - T_0)}{C_2 + (T - T_0)}, \tag{1}$$

wherein $a_T$ is the shift factor, $C_1$ and $C_2$ are visco-elastic constants, T is the testing temperature and $T_0$ is the reference temperature of 100° C. Here the following parameters were found to give a good description of the temperature dependence of PEF with the WLF equation: $C_1$=8.40 and $C_2$=51.15° C. In the present application these values for $C_1$ and $C_2$ will be used in the determination of the equivalent strain rate from the actually determined strain rate values.

The master curve shows the mechanical response of the PEF when subjected to certain stretching conditions. Here the hypothesis is applied that the WLF formula and master curve as found can be used to translate any stretching condition (temperature and strain rate E) to a location on the master curve. This hypothesis is validated with uniaxial stretching experiments that have different stretch conditions, but have the same location on the master curve according to $f \cdot a_r = \dot{\epsilon} a_r$; thus the frequency during dynamic mechanical thermal analysis (DMTA) testing is considered as equivalent to the uniaxial nominal strain rate during stretching. All couples with the same equivalent strain rate ($\dot{\epsilon} a_r$) show the same mechanical response upon stretching, which strengthens the validity of the hypothesis.

The invention further includes the recognition that beneficial heat resistance properties are influenced by stretching temperature and equivalent strain rate due to the amount of stretching and the stretching conditions. Stretching to ratios below the natural draw ratio (NDR) of the polymer will not result in the oriented meso-phase, which is required to develop a crystalline structure within seconds (strain induced crystallization; SIC) instead of minutes (suited for quiescent crystallization). Thus the stretch rate, represented by the equivalent strain rate is important. Together with the temperature the stretch rate, thus the equivalent strain rate, results in a morphology that has a higher heat resistance. Subsequent cooling conditions also play a role herein.

In the following embodiments of the invention are described. The embodiments described herein can be combined if not explicitly described as alternatives.

Preferably the method comprises a relaxation step. High relaxation times at temperatures above the glass transition of the specimen during and after blowing allow a further reduced shrinkage and improved thermal stability in PEF. The resulting higher crystallinity may also benefit other properties such as gas barrier and mechanical properties.

This relaxation step is preferably performed as
a) stretch blow-molding at a blow pressure in a range of 15 to 30 bar; and/or
b) using a mold comprising a material with a thermal conductivity below 30 W/(mK), preferably comprising a polymer material, even more preferred with a thermal conductivity between 0.01 and 5 W/(m K); and/or
c) introducing steam or water, preferably at a temperature of 50 to 100° C., in the container during stretch blow-molding; and/or
d) annealing at a temperature between a glass transition temperature of unstretched poly(ethylene 2,5-furandicarboxylate) and the blow mold temperature or at the blow mold temperature, preferably using a mold with a temperature in the range of 85° C. to 120° C., or more preferably between 90° C. and 110° C.; and/or
e) providing a cooling step with a cooling rate of at most 50° C./s.

The main purpose of the relaxation step is to allow the blow-molded container to remain at elevated temperature for a period in order to enhance the formation of a crystalline morphology that is heat-stable. Such a period of time may suitably range from 0.5 to 20 s, preferably from 1 to 10 s.

In option a) the use of a low pressure allows the formation of the container to last somewhat longer so that the resin is given additional time to crystallize.

In option b) the cooling of the formed container is slowed down as the heat transfer between the container and the mold is reduced, compared with the use of a conventional steel mold. During standard blow molding the cooling of the container once it touches the mold is very fast (<<1 s). It is beneficial for the morphology of the material to get to cooling time around or above 1 s.

In option c) the heat content of the water and/or steam provides for a slow cooling of the container, dependent on the temperature of the water and/or steam.

In option d) the mold is kept at elevated temperature so that the container is kept at this elevated temperature for a time sufficiently long to promote crystallization. In this option an appropriate heat transfer medium may be used to maintain the desired temperature.

In option e) any other method that can be achieved for a cooling down of the container during a period of 0.5 to 20 s, preferably from 1 to 10 s, is envisaged.

Keeping a stretched sample at the stretching temperature or close to or above the glass transition temperature promotes the creation of crystals and improves the perfection of crystals. Longer times will also promote the crystallinity, and mainly the perfection of the crystalline phase. The onset temperature at which shrinkage starts to occur is also further increased with maintaining the container for a period at an elevated post-stretching temperature.

In an embodiment of the invention the preform is provided as a pre-nucleated preform. By pre-nucleated preform is understood a preform that comprises crystalline nuclei of PEF resin. A pre-nucleated preform has a lower natural draw ratio. It is therefore easier to induce crystallinity by strain hardening, thus SIC becomes more favourable. Moreover one can heat up such a pre-nucleated preform to higher temperatures before it loses its rigidity and thus its shape during the heating. At higher blowing temperatures the molecular chains have more mobility and have a higher chance of forming crystals when cooling down, if the stretching rate was high enough to orient the amorphous phase and strain hardening is thus going on. Pre-nucleating can either be done in quiescent way or with the use of flow induced crystallization during melt processing. The pre-nucleating can also be effected by preparing the PEF resin with nucleating agents.

Using a blow mold with a mold temperature in a range of 70° C. to 100° C. is advantageous. It is further preferred if the preform is made of a poly(ethylene 2,5-furandicarboxylate) resin with an intrinsic viscosity (IV) in a range of 0.80 to 1.3 dL/g, preferably of 0.87 to 1.1 dL/g. In essence the higher the IV of the preform is, the more potential it has to form SIC and via this way improve the performance on shrinkage. With higher IV preforms, the processing conditions during blow molding will need to change towards higher drawing temperatures and/or lower stretch rates and lower overall stretch ratios, in order to accommodate for the lower natural draw ratio of the material and to obtain low shrinkage products. The upper limits of preform IV are given by internal stress, which gives an upper limit for the possible IV, with which containers could be reached.

As stated above the second aspect of the invention relates to a container, preferably fabricated according to the method according to the first aspect of the invention, comprising strain-induced crystalline poly(ethylene 2,5-furandicarboxylate). As explained above, strain-induced crystallinity of PEF allows for better shrinkage behavior under hot temperature and thus for container for hot filling applications. The container according to the second aspect of the invention shares the advantages described in the context of the method according to the first aspect. The presence of strain-induced crystallinity can be verified by means of X-ray diffraction. Whereas quiescent crystallization shows a halo in the X-ray spectrum, strain induced crystallinity shows blots in the spectrum.

Preferably the poly(ethylene 2,5-furandicarboxylate) has a degree of crystallinity in a range of 10 to 40%, more preferably of 20 to 35%. With such high degrees of crystallinity the advantageous high temperature resistance is improved. In this context it is stated that 100% crystallinity is described in Codou et al., Phys. Chem., Chem. Phys., 2016, 18, 16647-16658.

The poly(ethylene 2,5-furandicarboxylate) used in the preform will typically have a glass transition temperature of 80 to 85° C., which is the value for non-oriented poly (ethylene 2,5-furandicarboxylate). After the preform has been stretched according to the invention, the glass transition temperature in the oriented sample is higher. Advantageously the poly(ethylene 2,5-furandicarboxylate) in the container has a glass transition temperature higher than 95° C., as determined from the peak in loss modulus using a dynamic mechanical analyzer in tension mode according to ISO 6721-11. The glass transition temperature of PEF in the container is indicative for the onset temperature, after which shrinkage starts. Thus for example hot beverages can be filled in the container without shrinkage. In an embodiment of the invention the container has a shrinkage onset temperature higher than 85° C., preferably higher than 100° C.

Preferably the container is a bottle.

DETAILED DESCRIPTION OF THE FIGURES

Reference is made to FIGS. 1-4 to show the effects of the invention on shrinkage and morphology in different parts of a blow molded bottle.

PEF resin with an IV of 0.87 dL/g was injection molded into PEF preforms with a weight of 13.7 g. These preforms were blown at a preform temperature of 115° C. to a bottle with a volume of 12 oz (355 mL). The bottle mold was made of steel and had a 3D printed plastic insert at the shoulder of the bottle to print a logo on the bottle (see FIG. 1).

Figure 2:
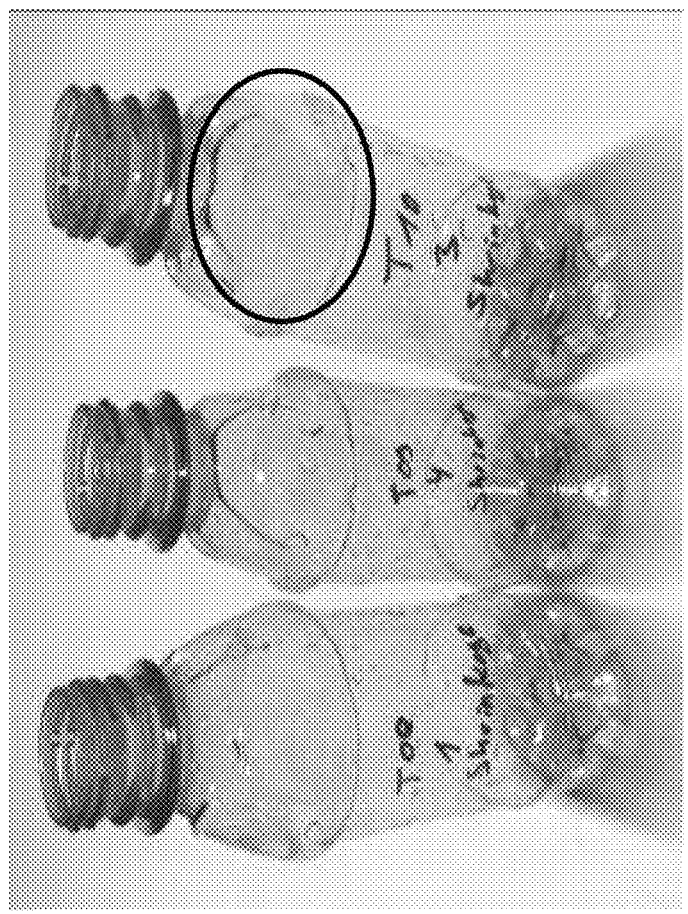
FIG. 2: Picture of 8 oz (237 mL) bottles after shrinkage test. Deformation of logo is low.

All bottles were subjected to a test where water at 100° C. is poured in the bottle and kept there for 15 minutes. The resulting shape of the bottles is shown in FIG. 2. The shape of the bottle is clearly less distorted around the location of the insert, indicating the influence of the cooling rate imposed by the mold after blowing, which will be much lower for the material touching the plastic insert due to the lower thermal conductivity of this part of the mold.

Figure 3:
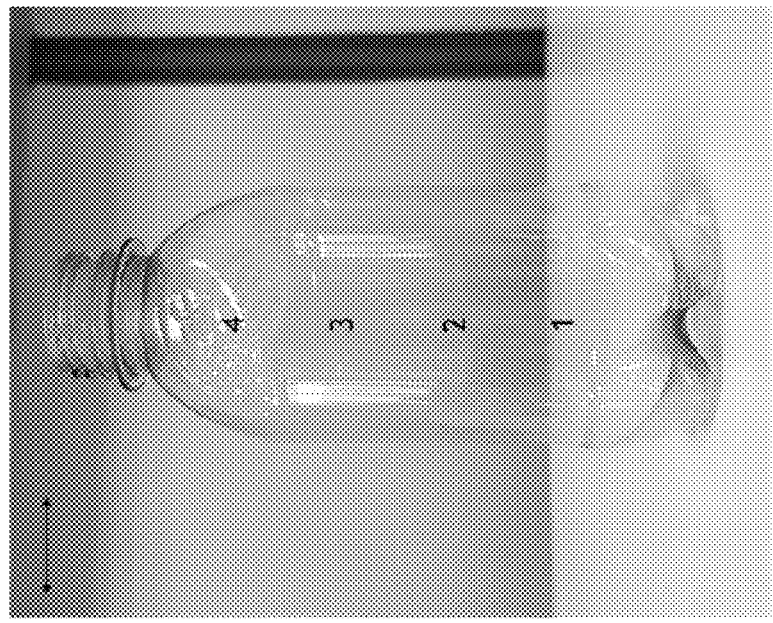
FIG. 3: Debye-Scherrer plot of X-Ray measurements in transmission at different locations of a PEF bottle.
Figure 3:
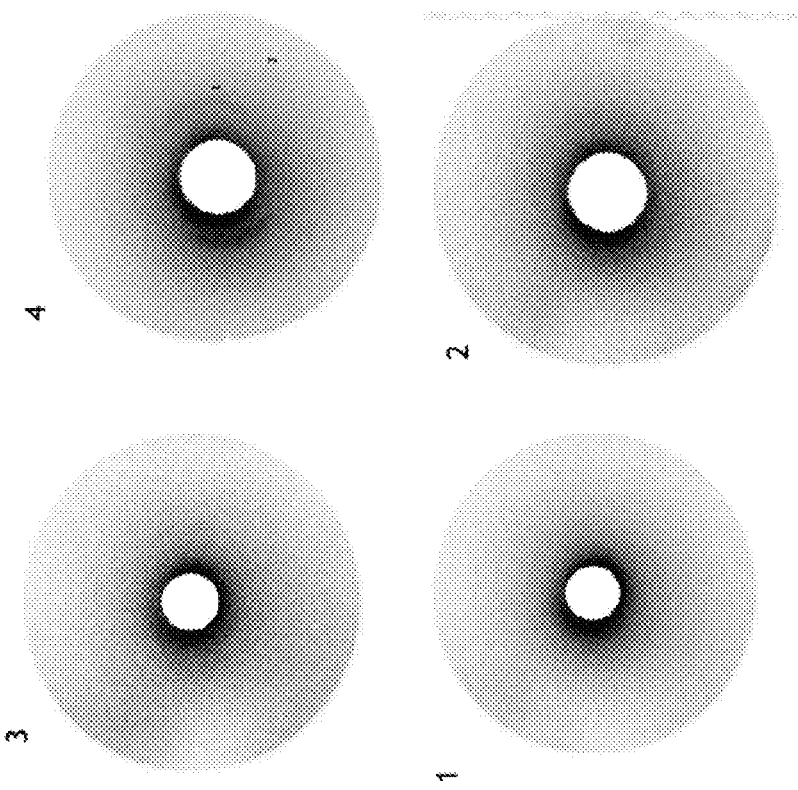

Data obtained from X-ray scans in transmission as shown in FIG. 3 as Debye-Scherrer plots, confirm this observation. Only for the scan around the logo some proof of crystallinity is observed (FIG. 3.4).

Figure 4:
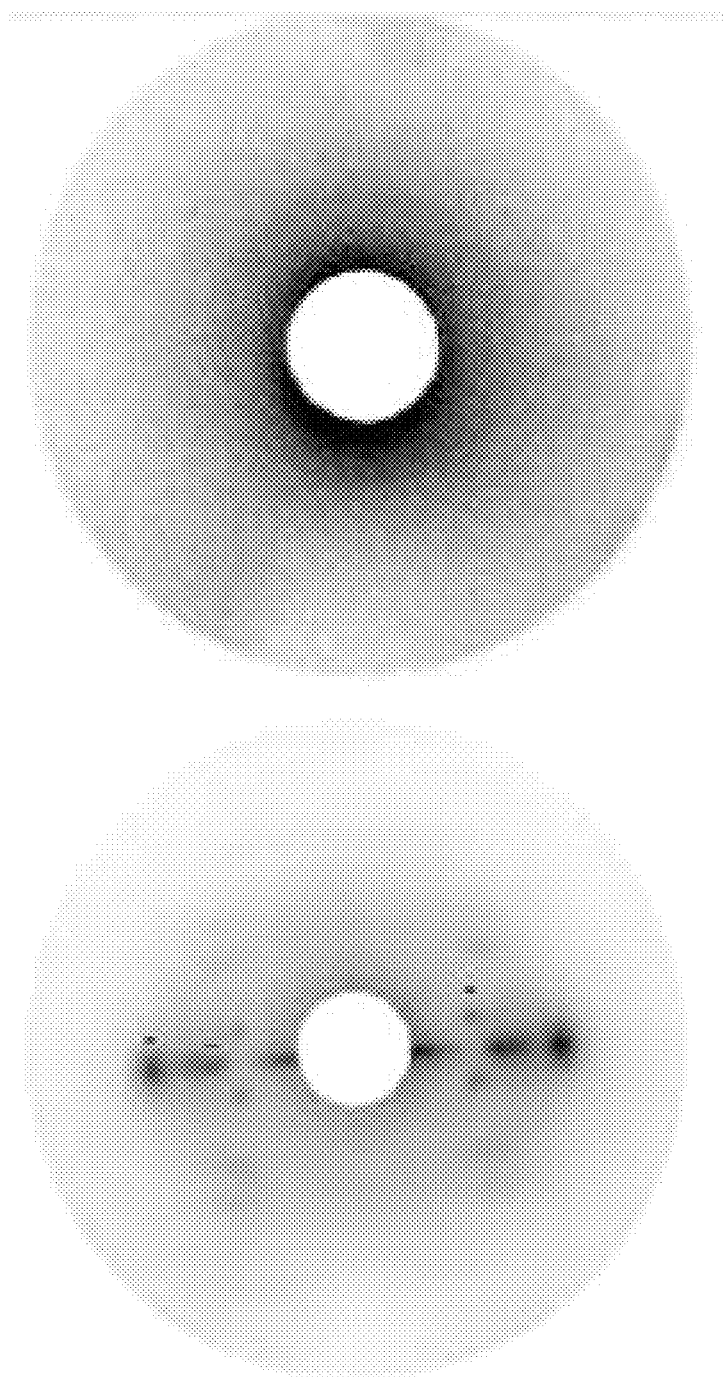
FIG. 4: WAXS (wide-angle X-ray scattering) patterns of (from left to right): uniaxially stretched PEF specimen (couple 2), a specimen from the top of the label area of a PEF bottle.

Further, the crystalline structure of a uniaxially stretched specimen looks entirely different than the morphology found in the bottle. The crystalline structure of the bottle as observed via WAXS is shown in FIG. 4. It is apparent that where for the uniaxially stretched conditions a clear presence of oriented crystalline structure, resembling that of a textured fiber is observed (see left hand figure), whereas in the bottle wall according to the prior art no clear evidence of crystals is observed (right hand figure). This also shows the potential to improve the shrinkage performance of PEF bottles and therefore the performance in hot filling applications.

In the following some examples of the invention are described.

Example 1: Increase of Glass Transition Temperature with Reduction of Shrinkage after Uniaxial Stretching PEF resin with an IV of 0.89 dL/g was extruded to a sheet with a nominal thickness of 0.7 mm. Subsequently, dogbone shape tensile specimens with a total length of 40 mm and maximum width of 14 mm and a parallel section of 8 mm by 8 mm were milled from the sheet. Each tensile specimen was heated for 5 minutes to obtain a homogenous temperature throughout the specimen before stretching. Subsequently, each specimen was stretched to a draw ratio of 6 and cooled down as fast as possible using compressed air. The stretching device used is a non-commercial one.

The stretched region of the PEF tensile bars were subjected to different characterization test: DMTA for shrinkage behavior and thermal transitions and Differential Scanning calorimetry (DSC) for crystallinity, type of amorphous phases and thermal transition. The resulting values can be found below. The DSC measurements were carried out using the TOPEM technology of Mettler Toledo and using a heating rate of 10° C./min. The DMTA measurements were carried out at a frequency of 1 Hz, strain amplitude of 0.1% and a heating rate of 1° C./min. The determination of the amount of strain induced crystallinity ($X_{SIC}$) is carried out in correspondence with the method outlined in Codou et al., "Glass transition dynamics and cooperativity length of poly (ethylene 2,5-furandicarboxylate) compared to poly(ethylene terephthalate)", Phys. Chem. Chem. Phys., 2016, 18, 16647-16658. The glass transition temperature after stretching, is measured in accordance with ISO 6721-11 and taken from the maximum in the loss modulus (E"). As a measure for the stiffness of the glassy polymer, the storage modulus (E') as measured at 60° C. is reported. The shrinkage is determined from the difference in length of the specimen between the glassy (~60° C.) and rubbery plateau (~160° C.) and the onset temperature is the temperature at which the shrinkage starts to occur. The resulting values are denoted in Table 1. For stretched articles such as bottles, both the stiffness and the heat resistance are of main interest.

The values in Table 1 indicate that stretching at the right conditions increases the temperature at which the stretched article starts to shrink significantly; Sample 10 is nearly fully amorphous (viz. only 3% crystallinity) and has an onset temperature of 85° C. as compared to the most stable sample (sample 6) with an onset temperature of 103° C. The latter sample also has the highest value for $T_g$, which is a good indicator for the onset temperature of shrinkage for the samples that have been stretched at equivalent strain rates between 0.05 and 5 s$^{-1}$. Sample 12 shows the results for the starting resin.

The results in Table 1 further indicate that the optimum for thermal resistance against shrinkage is found at higher equivalent strain rates, than when one would need a high stiffness in the container.

TABLE 1

Results of thermal and mechanical characterization of uniaxially stretched PEF specimens

| | Stretching | | | DSC | | DMTA | | Shrinkage | |
|---|---|---|---|---|---|---|---|---|---|
| Sample | $\dot{\epsilon}$, s$^{-1}$ | T, °C. | $\epsilon a_T$, s$^{-1}$ | $T_g$, °C. | $X_{SIC}$, % | E' (60° C.), MPa | $T_g$, (max E''), °C. | Shrinkage % | Onset T, °C. |
| 1 | 0.215 | 92 | 10 | 89 | 19 | 5826 | 114 | 17 | 94 |
| 2 | 0.662 | 94 | 10 | 87 | 23 | 2862 | 114 | 18 | 87 |
| 3 | 0.022 | 92 | 1 | 80 | 26 | 6284 | 107 | 19 | 87 |
| 4 | 0.066 | 94 | 1 | 87 | 21 | 6770 | 106 | 11 | 90 |
| 5 | 1.46 | 101 | 1 | 81 | 22 | 4965 | 110 | 22 | 100 |
| 6 | 7.56 | 106 | 1 | 90 | 21 | 6240 | 114 | 9 | 103 |
| 7 | 0.756 | 106 | 0.1 | 85 | 20 | 8371 | 106 | 8 | 96 |
| 8 | 0.076 | 106 | 0.01 | 82 | 25 | 5730 | 102 | 2 | 90 |
| 9 | 0.222 | 110 | 0.01 | 76 | 17 | 5037 | 102 | 2 | 89 |
| 10 | 0.066 | 115 | 0.001 | 76 | 3 | 4168 | 96 | 0.6 | 85 |
| 11 | 0.151 | 119 | 0.001 | 85 | 20 | 4219 | 96 | 0.9 | 89 |
| 12 | | Amorphous | | 81 | 0 | 2261 | 92 | | |

Samples 6 to 11 are according to the invention. They show a reduced shrinkage behavior. In addition, samples 6 and 7 show that when the equivalent strain rate is within the preferred range of 0.03 to 3 s$^{-1}$ not only the shrinkage is reduced, but also the onset temperature is enhanced.

Example 2: Influence of Relaxation During SBM

In this experiment a preform of PEF with an IV of 0.92 dL/g was stretch blow molded (SMB) into a bottle of 8 oz (237 mL). Blow molding took place at the preform temperature and at a blow pressure as indicated in Table 2. The equivalent axial strain rate ($\epsilon \cdot a_T$) values were calculated from the stretch rod speed divided by the height of the preform and corrected to the reference temperature using the WLF equation as shown in the description. The resulting values are indicated in Table 2.

Several SBM processing parameters were tested and found to affect shrinkage of the resulting PEF container. The results are shown in Table 2.

TABLE 2

| | Bottle Code | | | |
|---|---|---|---|---|
| | B1 | B2 | B3 | B4 |
| Processing | | | | |
| Preform temperature, °C. | 109 | 108 | 120 | 108 |
| $\dot{\epsilon} a_T$, s$^{-1}$ | 0.43 | 0.63 | 0.04 | 0.56 |
| Shrinkage | | | | |
| @ 70° C., % | 0 | 0 | 0 | 0 |
| @ 80° C., % | 10 | 6.6 | 1.4 | 7.5 |
| @ 90° C., % | 26 | 29 | 23 | 39 |
| Refractive Index | | | | |
| Δ Nx | 0.058 | 0.054 | 0.49 | 0.062 |
| Δ Ny | 0.057 | 0.068 | 0.076 | 0.050 |
| Δ P | 0.115 | 0.122 | 0.125 | 0.112 |
| n | 1.55 | 1.55 | 1.55 | 1.55 |

Bottles that were blown at different processing conditions were subjected to a shrinkage test, during which a bottle is filled with water at a specific temperature. The bottle is left filled for 15 seconds and then emptied. Subsequently, the brim-full volume of the bottle is measured and compared to the original volume of the bottle before the test. This test is carried out with water at 70° C., 85° C. and 100° C. The shrinkage performance at 85° C. and 100° C. is clearly dependent on the blow molding conditions and is mainly influenced by the higher preform temperature and equivalent strain rate during the blowing step. Bottle type B3 was blown from a preform with a temperature of 120° C. and resulted in a significantly lower amount of shrinkage after filling with water of 85° C. and 100° C.

The resulting amount of orientation is measured using an Atago NAR-4T refractometer. The difference in orientation in the axial direction and circumferential direction are denoted as $\Delta N_x$ and $\Delta N_y$, respectively. The definitions of these parameters are:

$$\Delta N_x = N_x - \frac{N_y + N_z}{2}$$

$$\Delta N_y = N_y - \frac{N_x + N_z}{2}$$

$$\Delta P = \frac{N_x + N_y}{2} - N_z$$

Parameter "n" represents the average refractive index. The ΔP parameter is a measure for the amount of orientation in the final structure is shows to be the highest for the bottle that has the least amount of shrinkage.

Example 3

PEF resin with an IV of 0.90 dL/g was extruded to a sheet of 0.3 mm thick. Subsequently, uniaxial specimens were milled from the sheet and stretched at different temperature/stretch rate combinations. After stretching to a draw ratio of 4, the specimen is kept at the stretching temperature for 3 minutes for relaxation. This relaxation time may be unattractive in an industrially viable process. A more preferred period ranges from 0.5 to 20 s. In the table below the DMTA data is shown as measured at a heating rate of 2° C./min and a frequency of 1 Hz and (tensile) strain amplitude of 0.1%. Table 3 shows values of various indicators for the glass transition temperature as determined from DTMA temperature sweeps at a heating rate of 2° C./min and a frequency of 1 Hz and tensile strain amplitude of 0.1% on non-stretched (reference) and several samples that have been stretched at different stretching conditions.

TABLE 3

| | Stretching | | | DSC | | DMTA | Shrinkage |
|---|---|---|---|---|---|---|---|
| Sample | $\dot{\epsilon}$, s$^{-1}$ | T, °C. | $\epsilon a_T$, s$^{-1}$ | $T_g$, °C. | $X_{SIC}$, % | $T_g$, (max E"), °C. | Shrinkage % |
| 1 | 1.58 | 96 | 8.15 | 106.8 | 26 | 113.9 | 16 |
| 2 | 1.58 | 101 | 1.09 | 109.5 | 26 | 116.3 | 14 |
| 3 | 0.16 | 96 | 0.83 | 100.8 | 23 | 108.6 | 13 |
| 4 | 1.58 | 105 | 0.28 | 106.8 | 31 | 112 | 8 |
| 5 | 0.5 | 105 | 0.09 | 109.5 | 30 | 109.5 | 7 |
| 6 | 1.58 | 110 | 0.07 | 105.5 | 29 | 109.9 | 4.8 |
| 7 | Amorphous | | | 80 | 0 | 83.4 | |

The results in Table 3 clearly indicate that stretching significantly influences the several indicators for the glass transition temperature, with an increase of up to 33° C. for the temperature at which the maximum in the storage modulus is reached. Samples 4 to 6 are according to the invention. They show excellent increase in Tg and have a shrinkage below 10%. Sample 7 shows the results of the starting resin.

The invention claimed is:

1. A method for fabricating a container having reduced shrinkage during hot filling which process comprises:
    providing a preform comprising a polymer and optionally one or more materials from the group consisting of stabilizers, colorants, impact modifiers, and combinations thereof; and
    stretch blow-molding the preform to form the container, wherein the stretch blow-molding comprises a stretching step of the preform to a ratio higher than the natural draw ratio of poly(ethylene 2,5-furandicarboxylate) at a temperature in a range of 110° C. to 140° C., and at an equivalent axial strain rate at a reference temperature of 100° C. in the range of 0.03 to 3 s$^{-1}$,
    wherein the polymer consists of poly(ethylene 2,5-furandicarboxylate).

2. The method according to claim 1, wherein the preform is provided as a pre-nucleated preform.

3. The method according to claim 1 further comprising using a blow mold with a mold temperature in a range of 70° C. to 150° C.

4. The method according to claim 1, wherein the preform is made of a poly(ethylene 2,5-furandicarboxylate) resin with an intrinsic viscosity in a range of 0.80 to 1.3 dL/g.

5. The method according to claim 1 wherein the container comprises strain-induced crystalline poly(ethylene 2,5-furandicarboxylate).

6. The method according to claim 5, wherein the poly(ethylene 2,5-furandicarboxylate) has a degree of crystallinity of in a range of 15 to 35%.

7. The method according to claim 5, wherein the poly(ethylene 2,5-furandicarboxylate) has a glass transition temperature higher than 95° C., as determined from the peak in loss modulus using a dynamic mechanical analyzer in tension mode.

8. The method according to claim 5, wherein the container has a shrinkage onset temperature higher than 100° C.

9. The method according to claim 5, wherein the container is a bottle.

* * * * *